(12) United States Patent
Chen et al.

(10) Patent No.: US 9,801,299 B1
(45) Date of Patent: Oct. 24, 2017

(54) SERVER DISK DRIVE HOLDER ASSEMBLY

(71) Applicant: Super Micro Computer Inc., San Jose, CA (US)

(72) Inventors: Richard S. Chen, San Jose, CA (US); Lawrence H. Liang, San Jose, CA (US); Jerry C. Yang, San Jose, CA (US)

(73) Assignee: SUPER MICRO COMPUTER INC., San Jose, CA (US)

( * ) Notice: Subject to any disclaimer, the term of this patent is extended or adjusted under 35 U.S.C. 154(b) by 0 days.

(21) Appl. No.: 15/283,297

(22) Filed: Oct. 1, 2016

(51) Int. Cl.
*H05K 5/00* (2006.01)
*H05K 7/14* (2006.01)
*H05K 5/02* (2006.01)
*H05K 7/20* (2006.01)
*G06F 1/18* (2006.01)

(52) U.S. Cl.
CPC ........... *H05K 7/1427* (2013.01); *G06F 1/187* (2013.01); *H05K 5/0221* (2013.01); *H05K 7/1485* (2013.01); *H05K 7/20709* (2013.01)

(58) Field of Classification Search
USPC .................................................. 361/752, 748
See application file for complete search history.

(56) References Cited

U.S. PATENT DOCUMENTS

| | | | |
|---|---|---|---|
| 2002/0027737 A1* | 3/2002 | Haitani .............. | G11B 5/59605 360/75 |
| 2005/0204373 A1* | 9/2005 | Ueno ................. | G11B 17/0286 720/616 |
| 2013/0279129 A1* | 10/2013 | Xie ........................... | G06F 1/16 361/752 |

* cited by examiner

*Primary Examiner* — Andargie M Aychillhum
(74) *Attorney, Agent, or Firm* — Chun-Ming Shih; HDLS IPR Services (57) ABSTRACT

A server disk drive holder assembly includes an outer tray, an inner tray and a latch arm. The outer tray includes a locking hole. The inner tray overlaps on the outer tray. The inner tray is movable with respect to the outer tray. The inner tray includes a fastening hole. A latch arm is pivotally disposed on an outer side of the outer tray. The latch arm includes a hook portion. When the locking hole is aligned with the fastening hole, the hook portion is inserted through the locking hole to be engaged with the fastening hole. A disk drive can be clamped between the outer tray and the inner tray. By utilizing the movable latch arm to fasten the outer tray and the inner tray, the disk drive can be quickly mounted and dismounted.

13 Claims, 10 Drawing Sheets

SERVER DISK DRIVE HOLDER ASSEMBLY

TECHNICAL FIELD

The present invention relates to a server and, in particular, to a server disk drive holder assembly for mounting and dismounting a disk drive without tools.

BACKGROUND

Normally, a disk drive is first placed in a carrier/tray, and then is put into a server housing to be fixed. To fix the disk drive in a server by means of the tray, conventional techniques are fixing the disk drive directly on the tray by screws. When it is desired to replace or repair the disk drive, it takes a long time to unfasten and fasten every screw. This is quite inefficient since an operator has many disk drives and servers to maintain and needs to mount and dismount the disk drives to and from the trays repeatedly. Therefore, it is important to improve work efficiency when replacing or maintaining disk drives and to reduce production costs of structures and components, so as to meet the server industry's requirements for a great number of the disk drives.

Accordingly, the inventor made various studies to solve the above-mentioned problems, on the basis of which the present invention is accomplished.

SUMMARY

The present invention provides a server disk drive holder assembly which can be operated without tools.

The present invention provides a server disk drive holder assembly, comprising an outer tray, an inner tray and a latch arm. The outer tray includes a locking hole. The inner tray overlaps on the outer tray. The inner tray is movable with respect to the outer tray. The inner tray includes a fastening hole. The latch arm is pivotally disposed on an outer side of the outer tray. The latch arm includes a hook portion. When the locking hole is aligned with the fastening hole, the hook portion is inserted through the locking hole to be engaged with the fastening hole.

In the server disk drive holder assembly of the present invention, the latch arm includes a cover, and the cover is pivotally disposed on the outer side of the outer tray.

In the server disk drive holder assembly of the present invention, a middle section of the latch arm is pivotally connected to the outer tray, the hook portion is at one end of the latch arm, and a flexible restoring element is connected between the other end of the latch arm and the outer tray to push the hook portion to the outer tray.

In the server disk drive holder assembly of the present invention, the outer tray includes an outer fastener, and the outer fastener fastens the inner tray. The inner tray includes an inner guide slot, and the outer fastener is inserted through the inner guide slot to be engaged with the inner tray.

In the server disk drive holder assembly of the present invention, the inner tray includes an inner fastener, and the inner fastener fastens the outer tray. The outer tray includes an outer guide slot, and the inner fastener is inserted through the outer guide slot to be engaged with the outer tray.

In the server disk drive holder assembly of the present invention, the outer tray includes an outer base board, a first sidewall is disposed at one side of the outer base board, the inner tray includes an inner base board, a second sidewall is disposed at one side of the inner base board, the inner base board overlaps the outer base board, and the first sidewall and the second sidewall are arranged opposite and spaced from each other. An inner side of the first sidewall and an inner side of the second sidewall are each disposed with at least one lock pin protruding therefrom. A pad is disposed on an outer side of the inner base board corresponding to the second sidewall. An outer front wall connected to the first sidewall is disposed at another side of the outer base board, an inner front wall connected to the second sidewall is disposed at another side of the inner base board, the outer front wall overlaps the inner front wall, the locking hole is formed on the outer front wall, and the fastening hole is formed on the inner front wall.

The server disk drive holder assembly of the present invention includes a conversion module, the conversion module includes a circuit board disposed between the first sidewall and the second sidewall, a first connector and a second connector having different specifications from each other are disposed on two surfaces of the circuit board respectively, the first connector is oriented toward the inside of the inner tray, and the second connector is oriented toward the outside of the inner tray.

In the server disk drive holder assembly of the present invention, the outer tray includes a plurality of heat dissipation holes, and the locking hole is one of the heat dissipation holes. The inner tray includes a plurality of heat dissipation holes, and the fastening hole is one of the heat dissipation holes.

In the server disk drive holder assembly of the present invention, the outer tray and the inner tray clamp the disk drive, and the movable latch arm fastens the outer tray and the inner tray, so that the disk drive can be mounted or dismounted without tools and screws.

BRIEF DESCRIPTION OF THE DRAWINGS

The disclosure will become more fully understood from the detailed description, and the drawings given herein below is for illustration only, and thus does not limit the disclosure, wherein.

DETAILED DESCRIPTION

Referring to FIGS. 1 to 5, a server disk drive holder assembly is provided according to a preferable embodiment of the present invention. The server disk drive holder assembly is disposed in a server housing for accommodating and mounting a disk drive 10. The disk drive 10 is preferably a 3.5-inch disk drive. The server disk drive holder assembly of the present invention includes an outer tray 100, an inner tray 200, a latch arm 300, and a conversion module 400.

Figure 1:
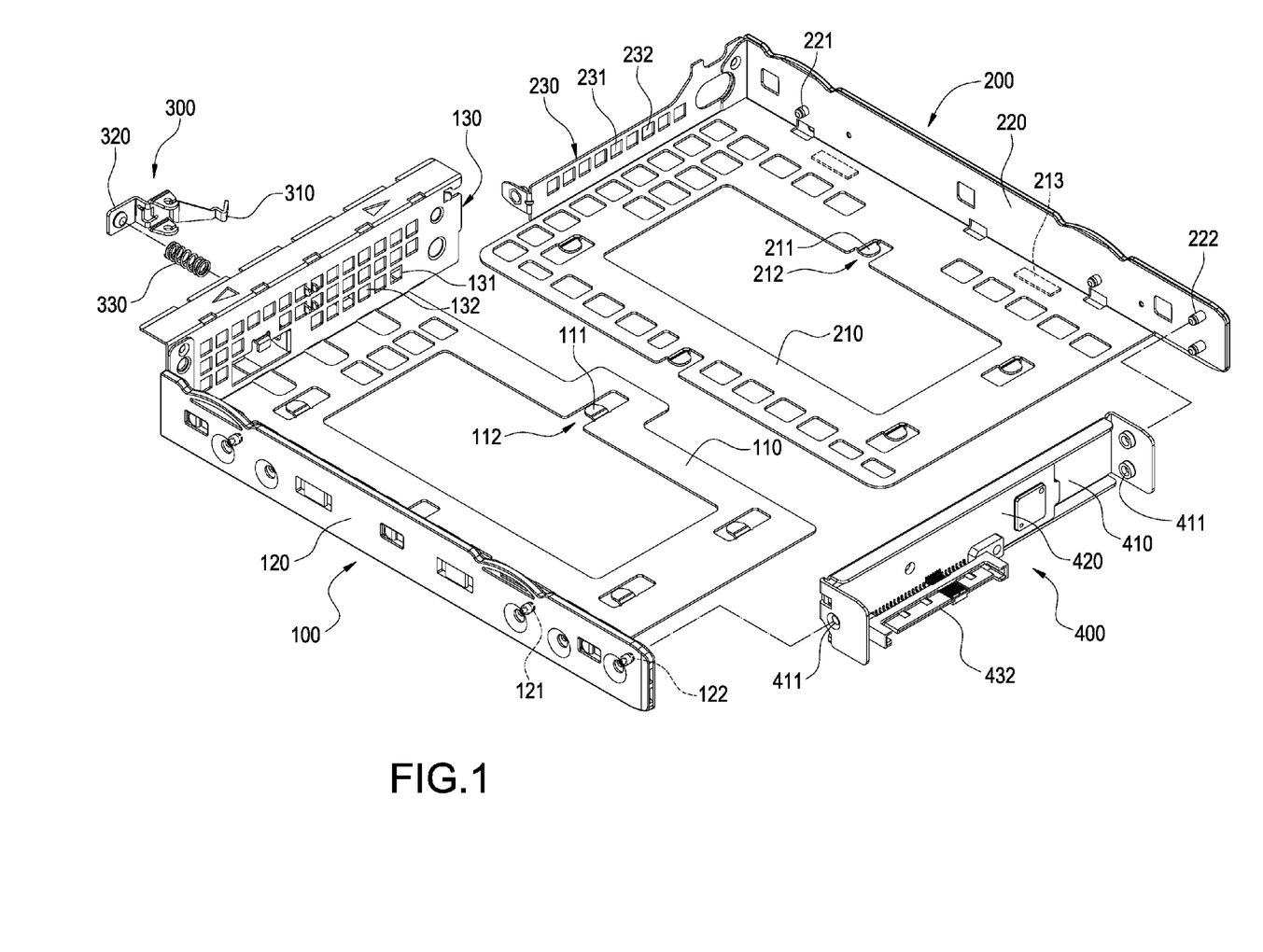
FIG. 1 is a perspective exploded view illustrating a server disk drive holder assembly according to a preferable embodiment of the present invention.
Figure 2:
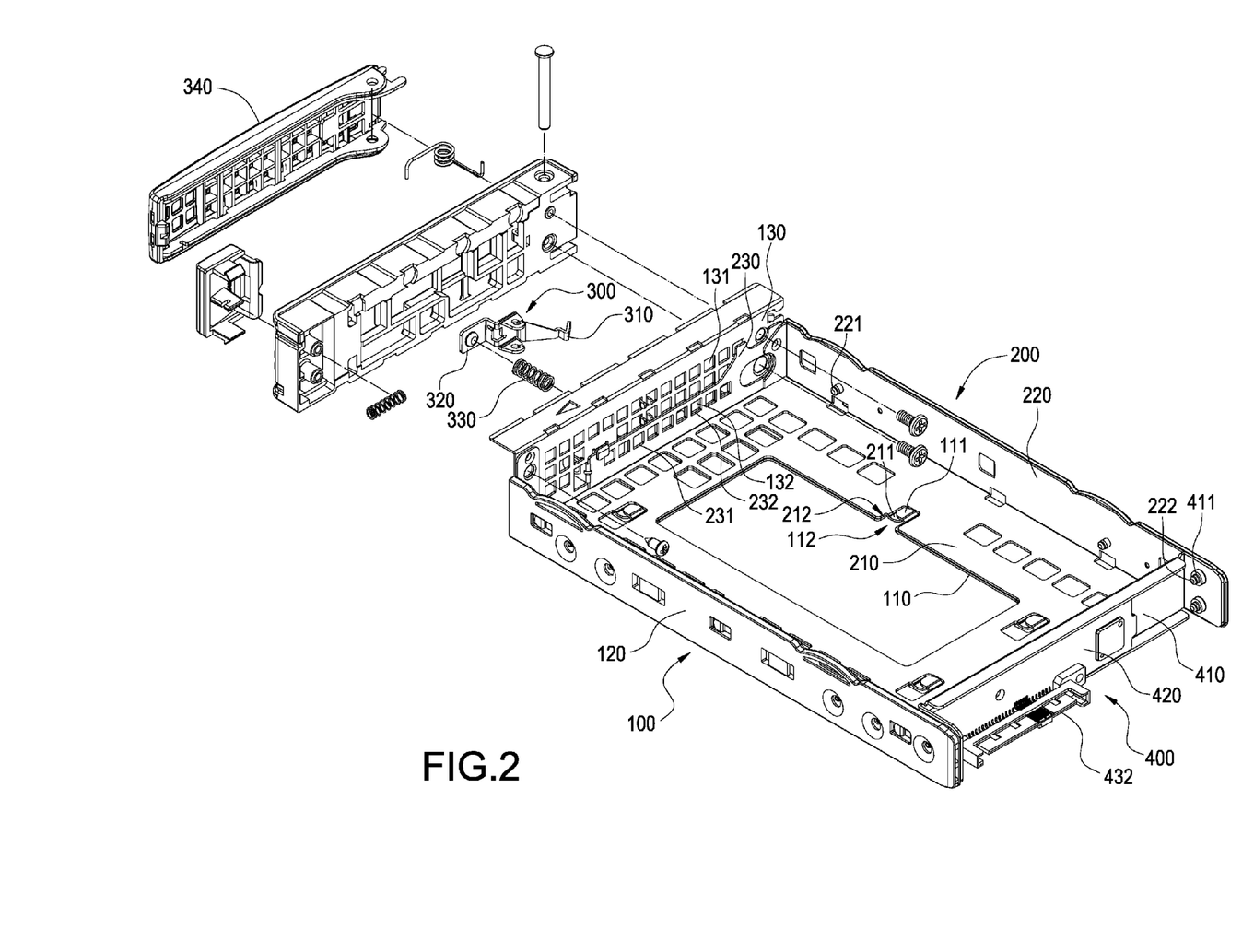
FIG. 2 is another perspective exploded view illustrating the server disk drive holder assembly according to the preferable embodiment of the present invention.

In the present embodiment, the outer tray 100 is preferably made of metal by a sheet-metal working method. The outer tray 100 is fixed inside the server housing. The outer tray 100 includes an outer base board 110 in a rectangular shape. A first sidewall 120 is vertically disposed at one lengthwise side of the outer base board 110. An outer front wall 130 connected to the first sidewall 120 is disposed at a widthwise side of the outer base board 110.

The outer base board 110 includes an outer fastener 111, and the outer base board 110 includes an outer guide slot 112 connected to the outer fastener 111. The outer guide slot 112 preferably extends in a widthwise direction of the outer base board 110. The outer fastener 111 preferably extends along a lengthwise direction of the outer base board 110 toward one side of the outer guide slot 112 closer to the first sidewall 120. An inner side of the first sidewall 120 has at least one lock pin 121 protruding therefrom toward the inside of the outer tray 100. One end of the inner side of the first sidewall 120 has at least one fastening pin 122 protruding therefrom toward the inside of the outer tray 100. A locking hole 132 is defined on the outer front wall 130 and penetrates the same. In the present embodiment, it is preferable that there are multiple heat dissipation holes 131 penetrating the outer front wall 130, and the locking hole 132 is one of these heat dissipation holes 131.

In the present embodiment, the inner tray 200 is preferably made of metal by a sheet-metal working method. The inner tray 200 overlaps on the outer tray 100, and the inner tray 200 is movable with respect to the outer tray 200. The inner tray 200 has an inner base board 210 in a rectangular shape. A second sidewall 220 is vertically disposed at one lengthwise side of the inner base board 210. An inner front wall 230 connected to the second sidewall 220 is disposed at a widthwise side of the inner base board 210.

The inner base board 210 includes an inner fastener 211, and the inner base board 210 includes an inner guide slot 212 connected to the inner fastener 211. The inner guide slot 212 preferably extends along a widthwise direction of the inner base board 210. The inner fastener 211 preferably extends along a lengthwise direction of the inner base board 210 toward one side of the inner guide slot 212 closer to the second side wall 220. An inner side of the second sidewall 220 has at least one lock pin 221 protruding therefrom toward the inside of the inner tray 200. One end of the inner side of the second sidewall 220 has at least one fastening pin 222 protruding therefrom toward the inside of the inner tray 200. A locking hole 232 is defined on an outer side of the inner front wall 230. The locking hole 232 can be a blind hole or a through hole, but the present invention is not limited in this regard. In the present embodiment, it is preferable that there are multiple heat dissipation holes 231 penetrating the inner front wall 230, and the locking hole 232 is one of these heat dissipation holes 231.

The inner base board 210 overlaps on the outer base board 110. The outer front wall 130 overlaps the inner front wall 230, and the first sidewall 120 and the second sidewall 220 are arranged opposite and spaced from each other.

A middle section of the latch arm 300 is pivotally connected to an outer side of the outer front wall 130. One end of the latch arm 300 forms a hook portion 310. A release button 320 is at the other end of the latch arm 300. A flexible restoring element 330 (e.g. a spring in the present embodiment, which is an example and is not intended to limit the scope of the present invention) is connected between the release button 320 and the outer front wall 130, so as to push the release button 320 away from the outer front wall 130 to thereby pivot the hook portion 310 of the latch arm 300 toward the outer front wall 130. A cover 340 covering the latch arm 300 is pivotally disposed on the outer side of the outer front wall 130 to prevent the latch arm 300 from being touched inadvertently.

A pad 213 is disposed on an outer side of the inner base board 210 corresponding to the second sidewall 220. The pad 213 is used to adjust a level difference between the inner base board 210 and the outer base board 110, thereby eliminating wobble when the inner tray 200 is pulled out from the outer tray 100.

Figure 3:
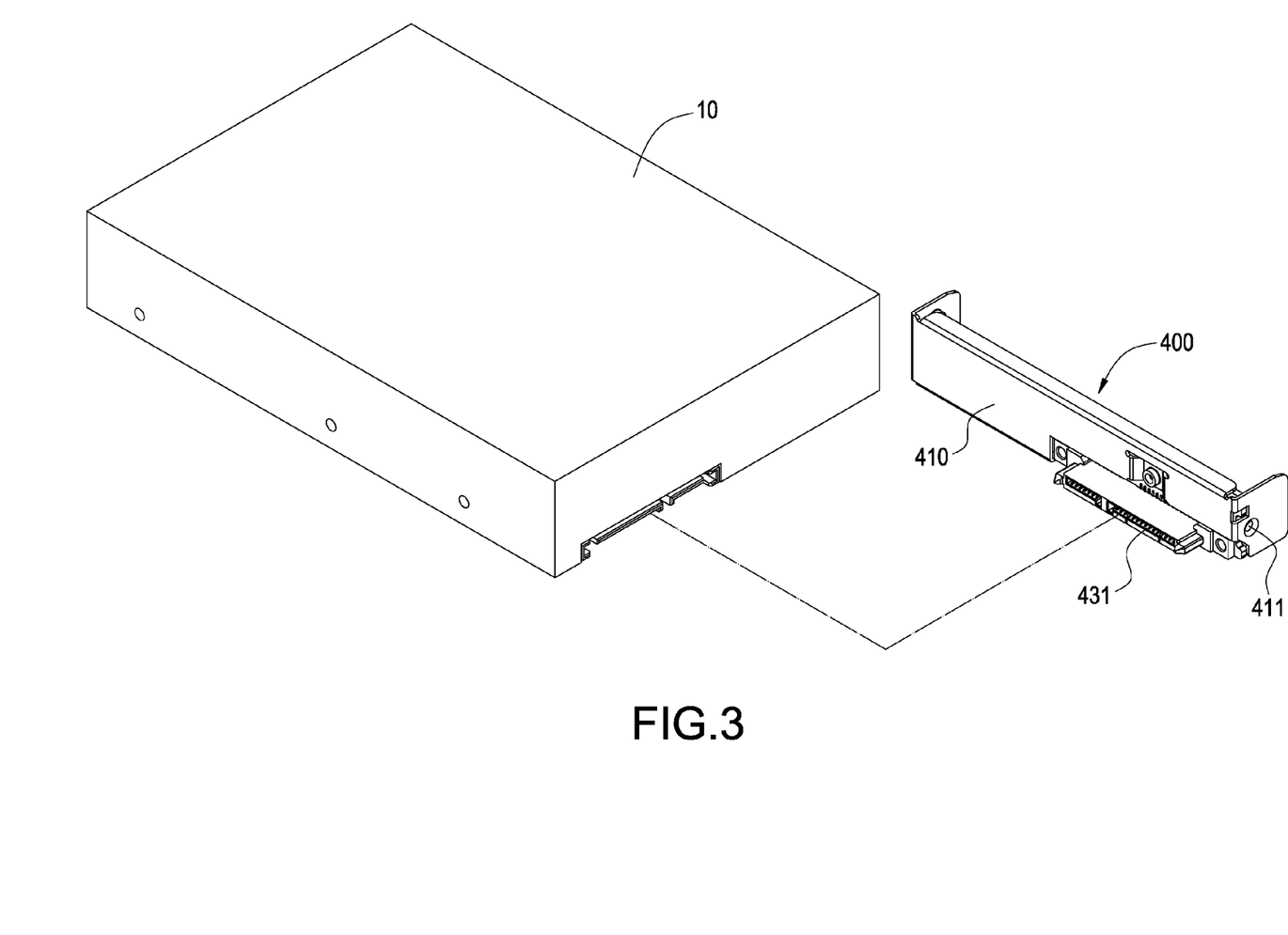
FIG. 3 is a schematic view illustrating a conversion module in the server disk drive holder assembly according to the preferable embodiment of the present invention.
Figure 4:
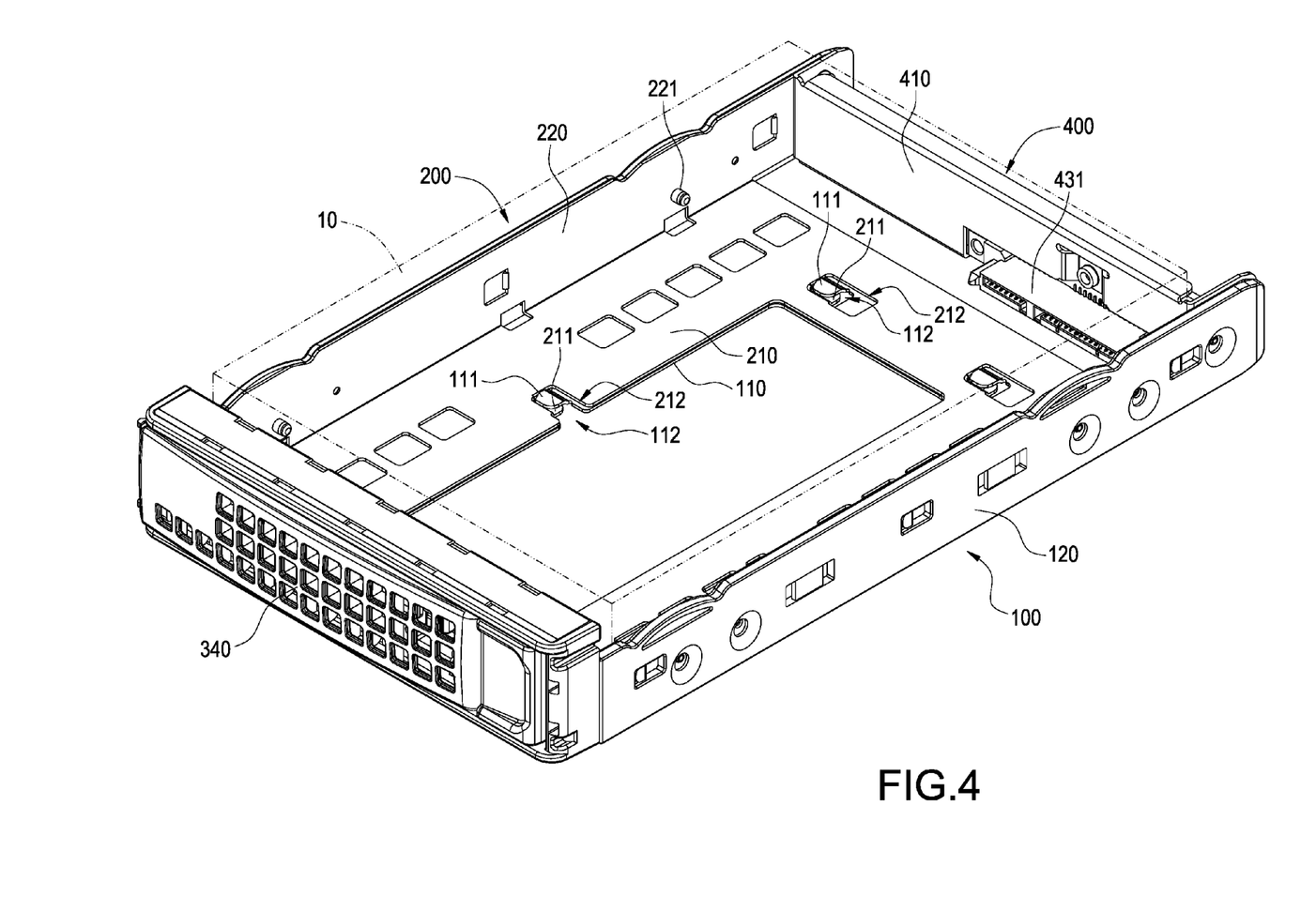
FIG. 4 is a perspective view illustrating the server disk drive holder assembly according to the preferable embodiment of the present invention.
Figure 5:
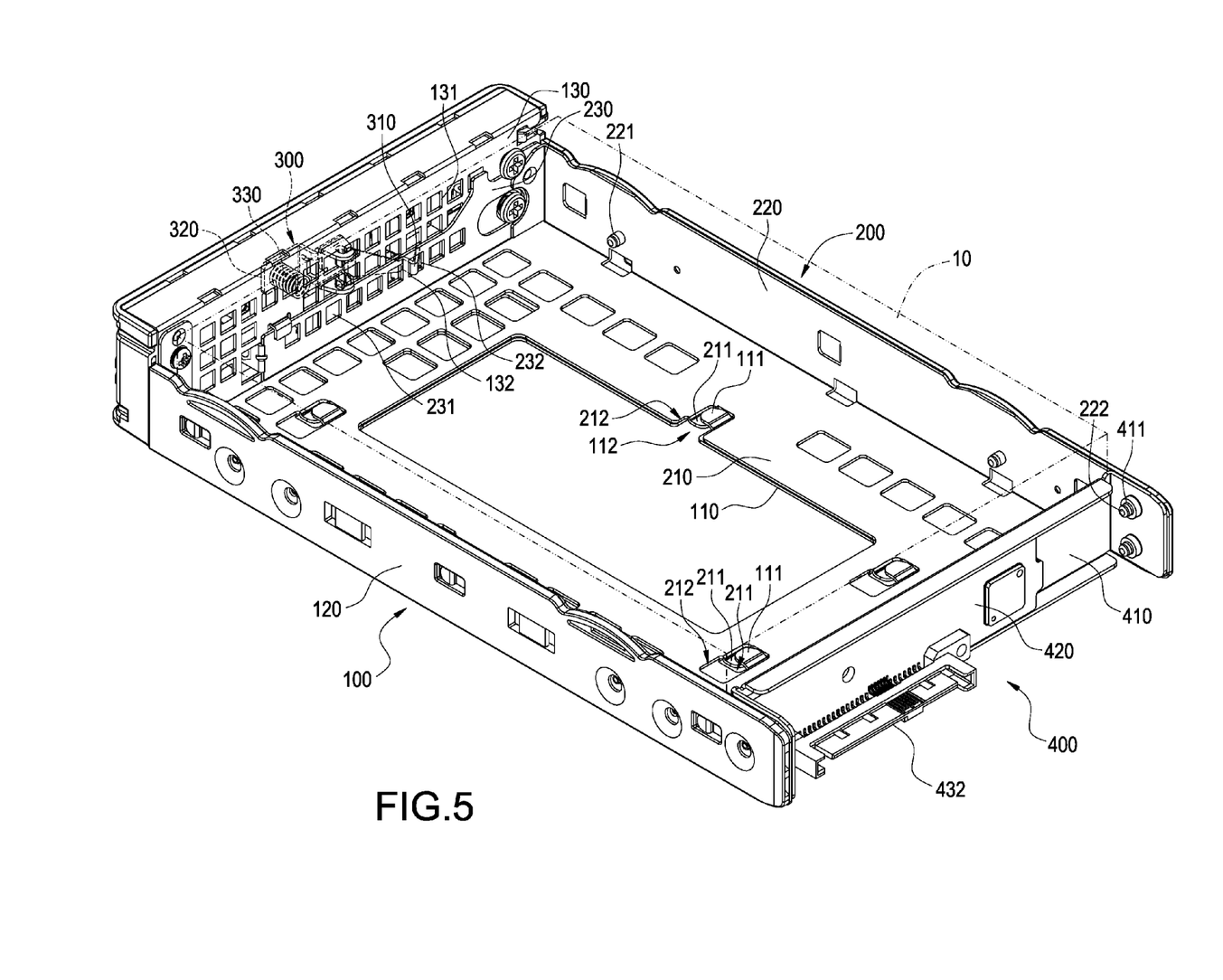
FIG. 5 is another perspective view illustrating the server disk drive holder assembly according to the preferable embodiment of the present invention.
Figure 6:
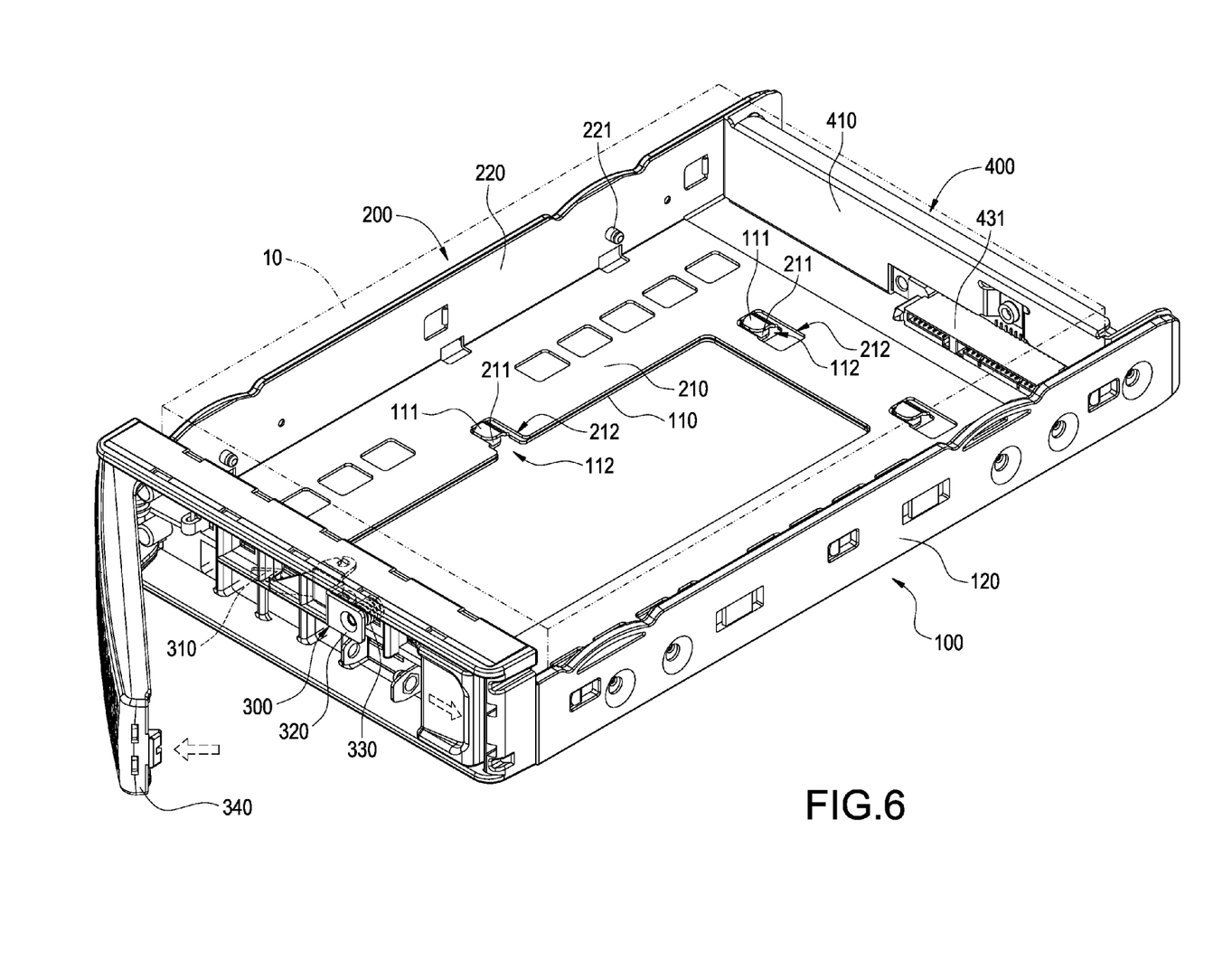
FIGS. 6 to 10 are schematic views illustrating usage of the server disk drive holder assembly according to the preferable embodiment of the present invention.
Figure 7:
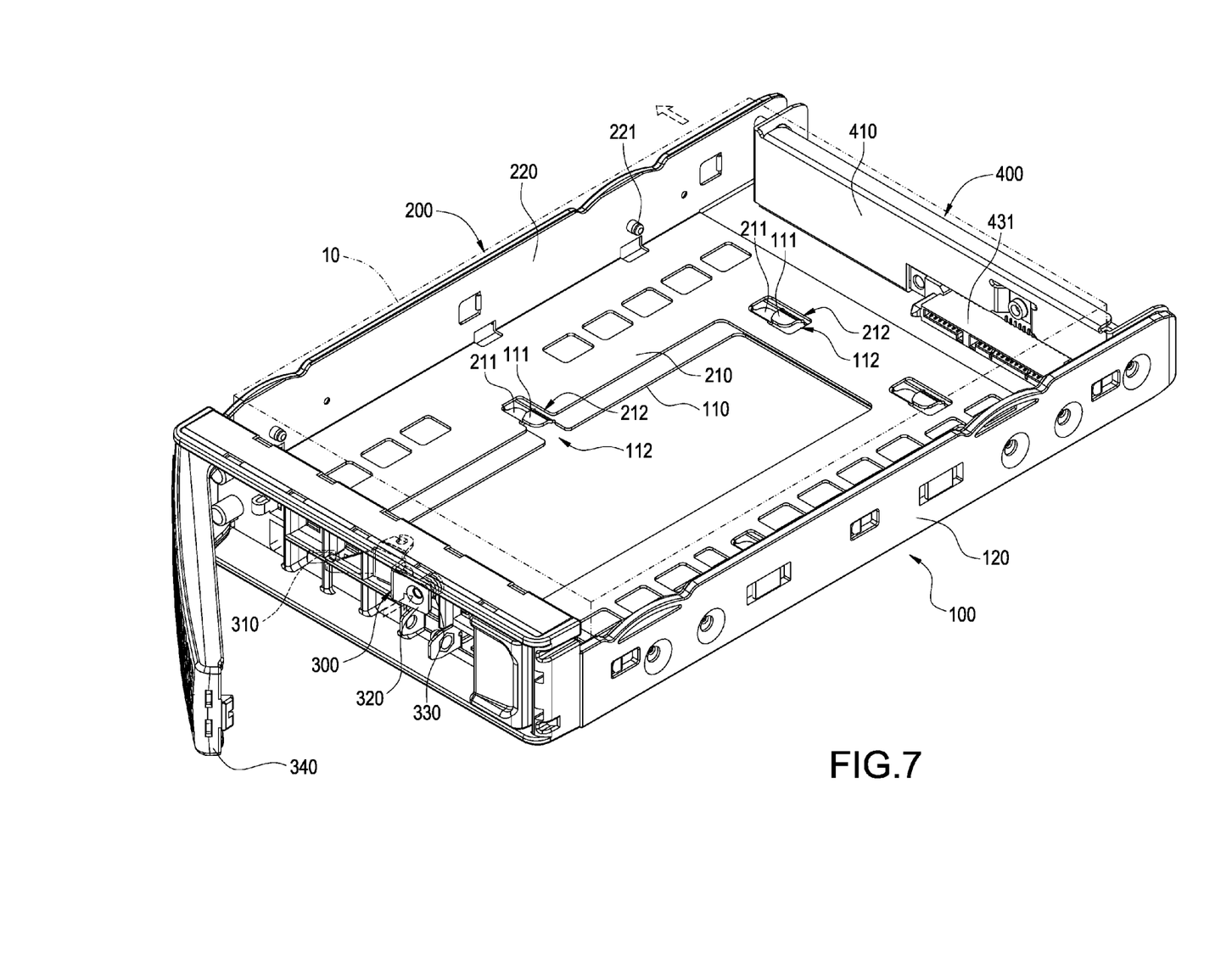
Figure 8:
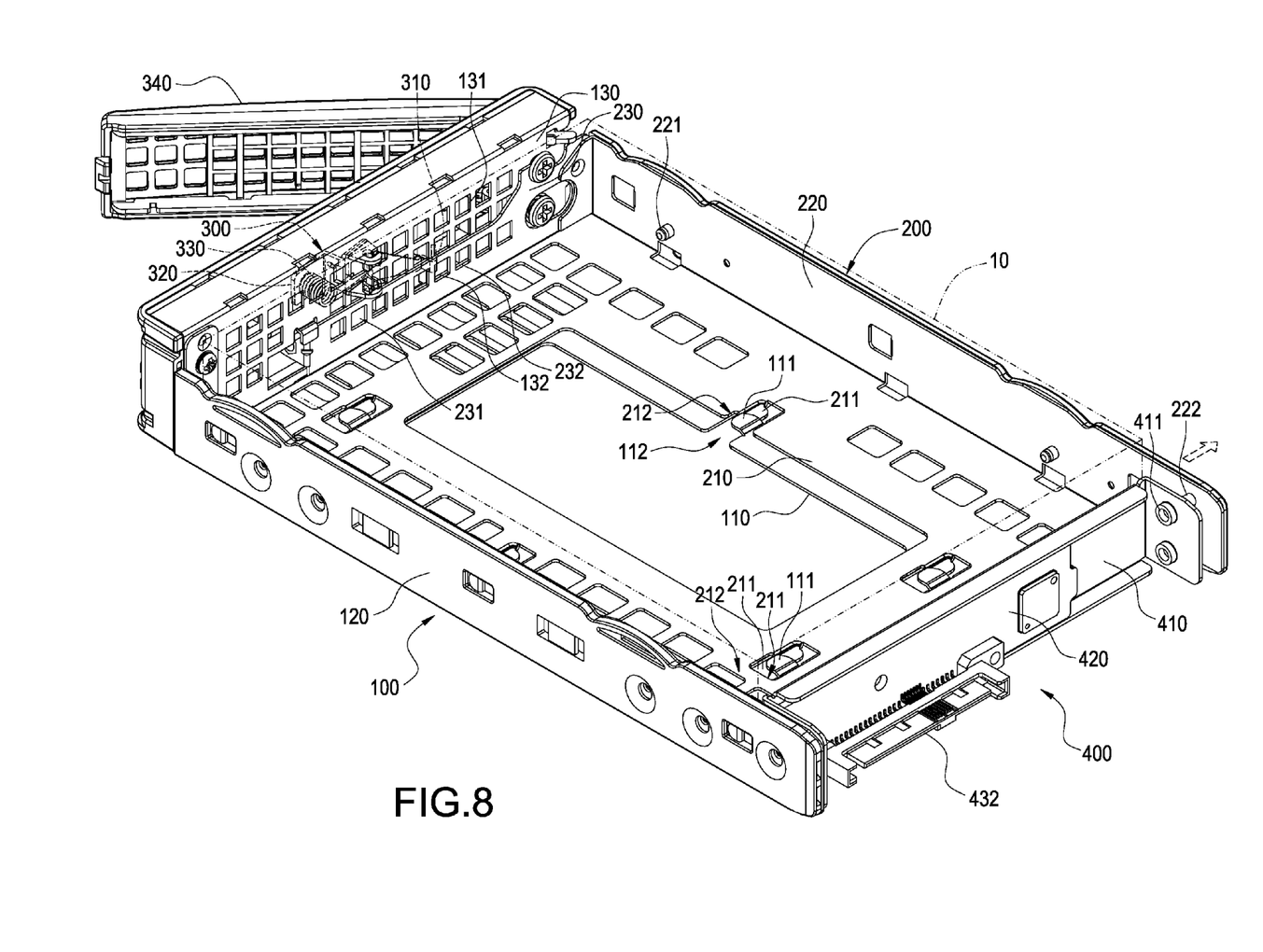
Figure 9:
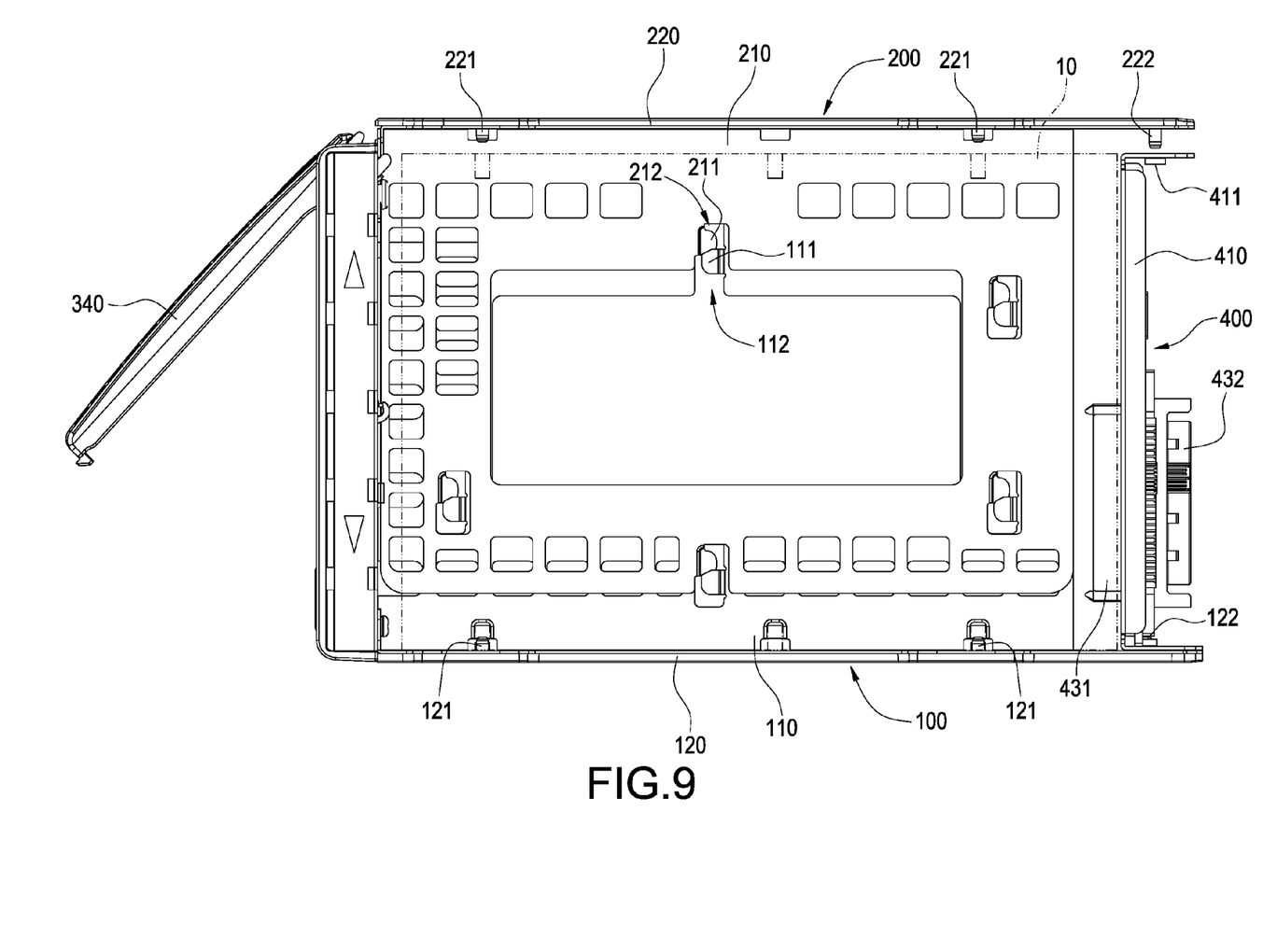
Figure 10:
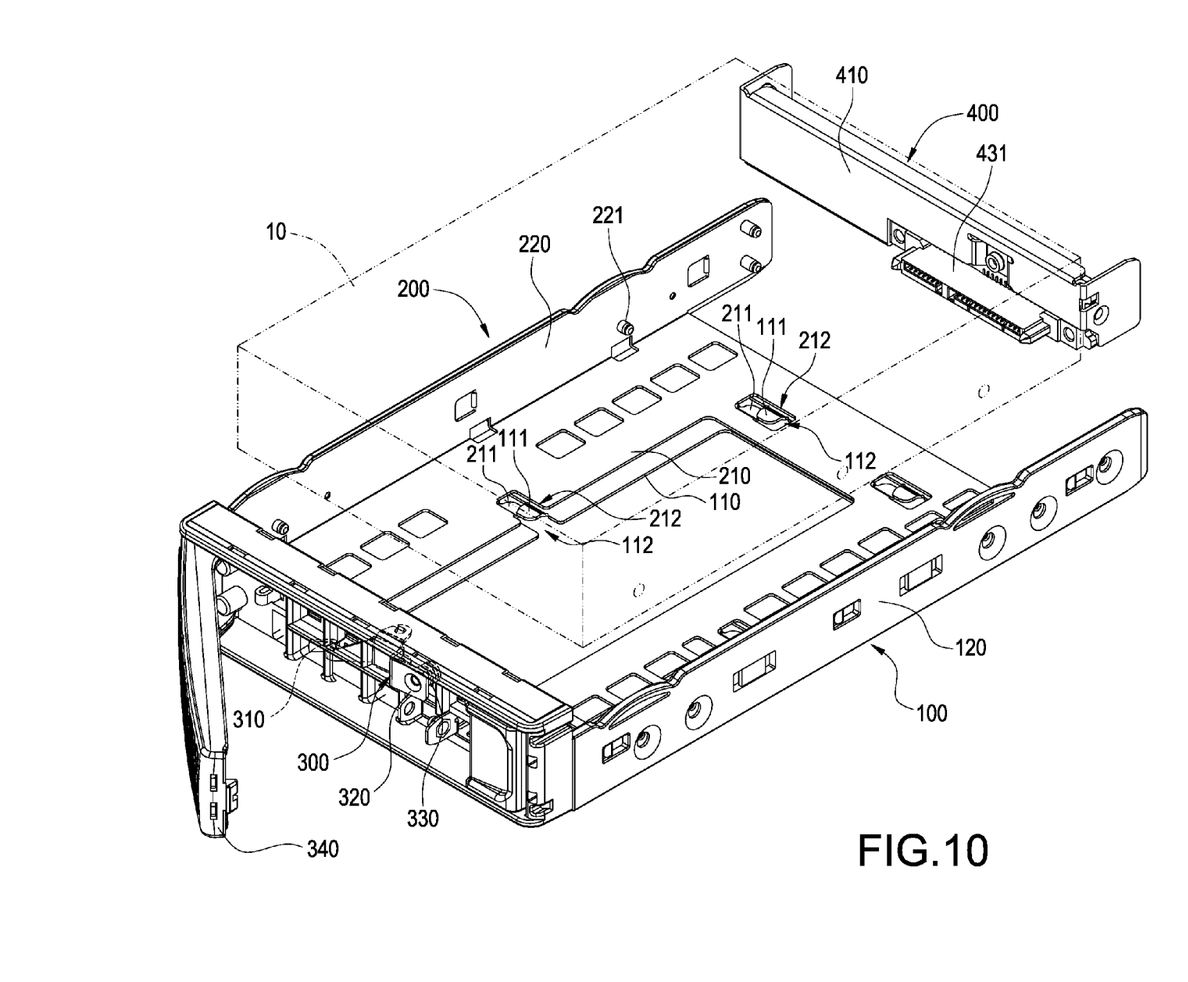

The conversion module 400 includes a fixation member 410, a circuit board 420, a first connector 431, and a second connector 432. The fixation member 410 has a plurality of securement holes 411. The circuit board 420 is fixed on the fixation member 410. A first connector 431 and a second connector 432 having different specifications from each other are disposed on two surfaces of the circuit board 420 respectively. The fixation member 410 is fixed between the first sidewall 120 and the second sidewall 220. The first connector 431 is oriented toward the inside of the inner tray 200, and the second connector 432 is oriented toward the outside of the inner tray 200. The first connector 431 is configured for connection to the disk drive 10, and the second connector 432 is configured for connection to a motherboard of a server. The first connector 431 complies with the SATA HDD specification while the second connector 432 complies with the SAS HDD specification. Therefore, the conversion module 400 can convert the inexpensive SATA HDD specification into the expensive SAS HDD specification so as to achieve compatibility for both specifications.

Referring to FIGS. 6 to 9, after the disk drive 10 is connected to the conversion module 400, the disk drive 10 and the conversion module 400 are together placed in the inner tray 200. When the inner tray 200 is moved into the outer tray 100, the outer fastener 111 is inserted through the inner guide slot 212 to fasten the inner tray 200. The inner fastener 211 is inserted through the outer guide slot 112 to fasten the outer tray 100. In the present embodiment, the outer fastener 111 and the inner fastener 211 are preferably engaged with each other to avoid detachment of the inner tray 200 from the outer tray 100. Each lock pin 121/221 is inserted into the disk drive 10 to secure the same. Each fastening pin 122/222 is inserted into each securement hole 411 of the fixation member 410 of the conversion module 400. The locking hole 132 is aligned with the fastening hole 232. The hook portion 310 of the latch arm 300 is inserted through the locking hole 132 to be engaged with the fastening hole 232. The disk drive 10 and the conversion module 400 are clamped and fixed between the first sidewall 120 and the second sidewall 220.

The cover 340 can be pivotedly open to allow operations of the latch arm 300. By pressing the release button 320 on the latch arm 300, the latch arm 300 is driven to rotate to extract the hook portion 310 from the locking hole 132 and the fastening hole 232, thereby releasing the outer tray 100 and the inner tray 200. By pulling the inner tray 200 out of the outer tray 100, the lock pin 121/221 is extracted from the disk drive 10, and each fastening pin 122/222 is extracted from the conversion module 400 to release the same. The outer fastener 111 and the inner fastener 211 slide along the inner guide slot 212 and the outer guide slot 112 respectively, so that the outer fastener 111 is detached from the inner fastener 211, and thereby the inner tray 200 can be taken out from the outer tray 100.

The server disk drive holder assembly of the present invention is so constructed that the disk drive 10 is clamped by the outer tray 100 and the inner tray 200, and the outer tray 100 and the inner tray 200 are fixed by the movable latch arm 300. Accordingly, to mount or dismount the disk drive 10, an operator needs only to press the release button 320 on the latch arm 300 to release the outer tray 100 and the inner tray 200, without tools and screws.

It is to be understood that the above descriptions are merely the preferable embodiment of the present invention and are not intended to limit the scope of the present invention. Equivalent changes and modifications made in the spirit of the present invention are regarded as falling within the scope of the present invention.

What is claimed is:

1. A server disk drive holder assembly, comprising:
    an outer tray, the outer tray including a locking hole;
    an inner tray, the inner tray overlapping on the outer tray, the inner tray being movable with respect to the outer tray, the inner tray including a fastening hole; and
    a latch arm, the latch arm being pivotally disposed on an outer side of the outer tray, the latch arm including a hook portion, wherein when the locking hole is aligned with the fastening hole, the hook portion is inserted through the locking hole to be engaged with the fastening hole,
    wherein a middle section of the latch arm is pivotally connected to the outer tray, the hook portion is at one end of the latch arm, and a flexible restoring element is connected between the other end of the latch arm and the outer tray to push the hook portion to the outer tray.

2. The server disk drive holder assembly of claim 1, wherein the latch arm includes a cover, and the cover is pivotally disposed on the outer side of the outer tray.

3. The server disk drive holder assembly of claim 1, wherein the inner tray includes an inner fastener, and the inner fastener fastens the outer tray.

4. The server disk drive holder assembly of claim 3, wherein the outer tray includes an outer guide slot, and the inner fastener is inserted through the outer guide slot to fasten the outer tray.

5. The server disk drive holder assembly of claim 1, wherein the outer tray includes an outer base board, a first sidewall is disposed at one side of the outer base board, the inner tray includes an inner base board, a second sidewall is disposed at one side of the inner base board, the inner base board overlaps the outer base board, and the first sidewall and the second sidewall are arranged opposite and spaced from each other.

6. The server disk drive holder assembly of claim 5, wherein an inner side of the first sidewall and an inner side of the second sidewall are each disposed with at least one lock pin protruding therefrom.

7. The server disk drive holder assembly of claim 5, wherein a pad is disposed on an outer side of the inner base board corresponding to the second sidewall.

8. The server disk drive holder assembly of claim 5, wherein an outer front wall connected to the first sidewall is disposed at another side of the outer base board, an inner front wall connected to the second sidewall is disposed at another side of the inner base board, the outer front wall overlaps the inner front wall, the locking hole is formed on the outer front wall, and the fastening hole is formed on the inner front wall.

9. The server disk drive holder assembly of claim 5, further comprising a conversion module, the conversion module including a circuit board disposed between the first sidewall and the second sidewall, a first connector and a second connector having different specifications from each other being disposed on two surfaces of the circuit board respectively, the first connector being oriented toward the inside of the inner tray, and the second connector being oriented toward the outside of the inner tray.

10. The server disk drive holder assembly of claim 1, wherein the outer tray includes a plurality of heat dissipation holes, and the locking hole is one of the heat dissipation holes.

11. The server disk drive holder assembly of claim 1, wherein the inner tray includes a plurality of heat dissipation holes, and the fastening hole is one of the heat dissipation holes.

12. A server disk drive holder assembly, comprising:
    an outer tray, the outer tray including a locking hole;
    an inner tray, the inner tray overlapping on the outer tray, the inner tray being movable with respect to the outer tray, the inner tray including a fastening hole; and
    a latch arm, the latch arm being pivotally disposed on an outer side of the outer tray, the latch arm including a hook portion, wherein when the locking hole is aligned with the fastening hole, the hook portion is inserted through the locking hole to be engaged with the fastening hole,
    wherein the outer tray includes an outer fastener, and the outer fastener fastens the inner tray.

13. The server disk drive holder assembly of claim 12, wherein the inner tray includes an inner guide slot, and the outer fastener is inserted through the inner guide slot to fasten the inner tray.

* * * * *